3,058,947
COMPOSITION COMPRISING A STYRENE-GLYCIDYL METHACRYLATE-ETHYL ACRYLATE TERPOLYMER AND AN EPOXY ACTIVE AGENT, AND METAL SUBSTRATE COATED THEREWITH
Charles F. Fryling and Leonard F. Guziak, Pittsburgh, Pa., assignors to Koppers Company, Inc., a corporation of Delaware
No Drawing. Filed Dec. 22, 1959, Ser. No. 861,214
8 Claims. (Cl. 260—43)

This invention relates generally to coatings and more particularly to coatings which are heated or baked.

It is common practice to provide durable finishes for metal articles ranging in size from jewelry to automobile bodies by applying a coating to the article by dipping, spraying, or brushing the article with a liquid coating and then heating the article so as to bake the coating.

It has now been found that a flexible, impact resistant, and chemical resistant coating can be produced by baking a coating comprised of a terpolymer of styrene, ethylacrylate and glycidyl methacrylate and an epoxy active agent.

The terpolymer for use in this invention is formed by copolymerizing styrene, ethylacrylate and glycidyl methacrylate in an inert solvent in the presence of an initiator such as benzoyl peroxide. An excellent terpolymer for use in the invention is comprised of 60 parts of styrene, 20 parts by weight of ethylacrylate and 20 parts by weight of glycidyl methacrylate. As the proportion of styrene in the terpolymer is increased and the proportion of ethylacrylate and glycidyl methacrylate is decreased, the flexibility of the film decreases and the film becomes more brittle. Also, with lower ethylacrylate and glycidyl methacrylate ratio, the solvent resistance and infusibility decreases. It has been found therefore that advantageously the ingredients used should not be varied individually more than ten percent in either direction from the 60–20–20 ratio. While ethylacrylate is the preferred monomer because of its internal plasticizing action on the terpolymers, other homologs of ethylacrylates may be used, for example, methylacrylate and ethyl hexyl acrylate. Glycidyl methacrylate, i.e., 2,3-epoxypropyl methacrylate is described in United States Patent No. 2,524,432.

The epoxy active agent is a polyfunctional compound selected from the class consisting of dicarboxylic acids and anhydrides (which acids contain at least 6 carbon atoms), polyamides, and resins of the phenolicformaldehyde novolak and urea-formaldehyde type. Advantageously, the epoxy active agent should comprise by weight at least 5 percent of the composition. Particularly good coatings are provided when the concentration of epoxy active agent in the composition is within the range of from ten to twenty percent of the composition.

It is believed that the unusual physical and chemical properties of the coatings resulting from the composition are due to a cross-linkage of the epoxy active agent with the epoxy group in the terpolymer, the epoxy group being originally a portion of the glycidyl methacrylate. Ethyl acrylate is believed to provide an internal plasticizing function for the cross-linking product. Such coatings in any event are flexible and impact resistant and resistant to organic solvents.

The composition resulting from the admixture of the terpolymer and the epoxy active agent slowly forms a gel at room temperature. To obtain desirable characteristics, however, the coating should be applied to the article and then baked. The time of baking varies. After baking the coating at 160° C. for 45 minutes the coating becomes flexible and impact resistant while a baking at 200° C. for four minutes provides a coating having similar characteristics. In the following examples, the flexiblity of the coatings is tested by bending a metal having the coating thereon about a mandrel, the diameter of test mandrels vary from 1/8 inch to 1 inch. The impact resistance is measured by a Gardner Variable Impact Testor.

The invention will be further illustrated by the following examples:

*Example I*

To form the terpolymer, 60 parts by weight of styrene, 20 parts by weight of ethylacrylate, and 20 parts by weight of glycidyl methacrylate were added to 100 parts by weight of methyl ethyl ketone and 3 parts by weight of benzoyl peroxide in an agitated reactor. The polymerization was carried out by heating and agitating the solution while maintained at a temperature of 70° for a period of 20 hours. Thereafter the solution of terpolymer was cooled to room temperature.

*Example II*

A resin prepared at a 1.0/0.8 phenol-formaldehyde ratio in the presence of barium hydroxide was mixed with the terpolymer of Example I to form a blend composition. A coating of the blend was applied to panels of 20-gauge degreased steel by use of a Fisher-Payne Dip Coater, the coating air-dried to a film that was slightly opaque; the film after baking at 160° C. for forty-five minutes was yellow. Baked coatings of blends containing 16, 20, 24, 28, and 32 percent of the resin provided coatings with films that were solvent resistant.

*Example III*

A 1.0/1.0 o-cresol-formaldehyde novolak was mixed with the terpolymer of Example I to provide a blend having by weight 25 percent of the novolak. Strips of metal having a film thereon of 0.8–0.9 mil thickness baked as in Example II failed when they were bent around a mandrel having a diameter of ½ inch and also under 8 inch-pound impact test as determined by a Gardner Variable Impact Testor. The films were solvent resistant.

The two component blend was mixed with 0.01, 0.02 and 0.04 percent of p-toluenesulfonic acid, an external catalyst for the curing of epoxy compounds. The baked film properties were not changed.

*Example IV*

60–20–20 styrene-ethyl acrylate-glycidyl methacrylate terpolymer was prepared according to the procedure of Example I except xylene was used as a solvent. This terpolymer was evaluated in the same series of tests as in Example II. Such films became opaque but did not crack on a 56 inch-pound impact.

*Example V*

The terpolymer of Example IV was evaluated as a blend with a 1.0/1.6 o-cresol-formaldehyde novolak in the same series of tests as in Example III. The films passed the test of flexing about a 1/8 inch mandrel but a 56 inch-pound impact test produced a trace of opaqueness in the films.

*Example VI*

The terpolymer of Example I was blended with 12 and 25 percent of a polyamide, Versamid 125, to provide two solutions. A clear solution was obtained in each case by adding isopropyl alcohol to the mixture. Although the air-dried films formed from the coatings on test panels of a 20 gauge steel were opaque, after baking for 45 minutes at 160° C. clear films and leather grained appearance were obtained. The coatings prepared with 12 percent of the polyamide failed upon flexing about a 1/8 inch diameter mandrel, the coatings prepared from blends that contained 25 percent of the polyamide could be flexed about an 1/8 inch mandrel, did not fail a 56 inch-pound impact test, and were not affected by a six hour immersion in acetone or toluene.

Example VII

Blends of the terpolymer of Example I were made with the dicarboxylic acids, glutaric, adipic, azelaic and sebacic acids, i.e., the 5-, 6-, 9- and 10-carbon acids. The terpolymer and acid were mixed so as to provide weight percents of 5, 10, 15 and 20 percent of each acid. It was necessary to use a small amount of isopropyl alcohol to obtain compatible solutions. Dip-coated tin plate strips were baked at 160° C. for 45 minutes and films of 0.8–1.0 mil thickness were obtained. The flex and impact resistance data are listed below.

| Acid Blend, Percent | Flexibility | Impact Resistance |
|---|---|---|
| A. Glutaric Acid: | | |
| 5 | Failed ½ in., crazed | Fail 4 in.-lb. on the reverse impact. |
| 10 | Failed ⅛ in., crazed | |
| 15 | ----do---- | |
| 20 | Failed ⅛ in., cracked | Cracked films were obtained. |
| B. Adipic Acid: | | |
| 5 | Failed ½ in., crazed | Fail at 4–56 in.-lb. |
| 10 | Failed ⅛ in., crazed | Opaque films were obtained on the reverse impact. |
| 15 | Passed ⅛ in | Pass 56 in.-lb. |
| 20 | Not tested¹ | Not tested.¹ |
| C. Azelaic Acid: | | |
| 5 | Failed ½ in., crazed | Fail at 4–56 in.-lb. Opaque films were obtained on the reverse impact. |
| 10 | ----do---- | |
| 15 | Passed ⅛ in | Pass 56 in.-lb. |
| 20 | ----do---- | Do. |
| D. Sebacic Acid: | | |
| 5 | Failed ⅛ in., crazed | Fail at 4–56 in.-lb. Opaque films. |
| 10 | Passed ⅛ in | Pass 56 in.-lb. |
| 15 | ----do---- | Do. |
| 20 | Not tested¹ | Not tested. |

¹ Samples not tested, solutions became opaque.

Cross-linked, solvent resistant films were obtained in all tests. At all concentrations, glutaric acid, a five-carbon dicarboxylic acid showed no promise as a blending agent with the terpolymer; although readily compatible with the methyl ethyl ketone solution of the terpolymer, incompatible films were obtained that lacked flex and impact resistance.

The six- and ten- carbon dicarboxylic acids, adipic and sebacic, were insoluble in methyl ethyl ketone, therefore, isopropyl alcohol was required to obtain solubility. Films of good flex and impact resistance were obtained at 15 percent of the adipic acid and at 10 and 15 percent of the sebacic acid.

The dicarboxylic acid, azelaic acid, was readily soluble in a solution of the terpolymer in methyl ethyl ketone. Clear films of good flexibility and impact resistance were obtained when the blend composition contained 15 and 20 percent of azelaic acid. Baked strips that were so coated with a blend that contained 20 percent of azelaic acid as to provide films of 0.8–0.9, 0.9–1.0 and 1.1–1.2 mil thicknesses passed the ⅛ inch mandrel flex test and a 56 inch-pound impact test. When a 16-gauge copper wire was coated with this blend and baked and coated wire subsequently coiled into concentric rings of 0.5 inch diameter, the coated wire withstood immersion in 4N nitric acid solution for one half hour, thereby demonstrating that the film had not cracked.

Example VIII

Phthalic anhydride was soluble in and compatible with the terpolymer and solvent solution of Example I. Baked coatings were prepared with blends of the terpolymer and phthalic anhydride that contained 5, 10, 15, 20 and 25 percent of phthalic anhydride. Although the baked coatings prepared from these blends all crazed upon bending around a ¼ inch mandrel, a trend was observed in the impact resistance. Films obtained from blends that contained at least 15 percent phthalic anhydride passed a 56 inch-pound impact test although the films became opaque on the reverse impact point.

The foregoing has presented a novel coating composition. Organic solvents may be added to this composition in varying amounts and proportions depending upon the application and coating conditions. For example, the composition may require an adjustment in the quantity of solvent to produce the most satisfactory spreading, flowing, and drying properties for brushing, spraying, or dipping. Suitable solvents include acetone, methyl ethyl ketone, isophorone, ethyl acetate, butyl cellosolve, butyl carbitol acetate, xylene, and toluene.

As will be understood by those skilled in the art, various pigments, fillers, and extenders, for example, titanium dioxide, red lead, zinc oxide, diatomaceous earth, and so forth may be added to the composition to obtain a desired color or consistency.

We claim:

1. A composition capable of forming a baked coating comprising a terpolymer solution formed by copolymerizing in inert solvent from 50 to 70 parts of styrene, 10 to 30 parts of glycidyl methacrylate and 10 to 30 parts of ethyl acrylate, said terpolymer being admixed with from 5 to 30 parts of an epoxy active agent selected from the group consisting of a dicarboxylic acid having at least six carbon atoms, a phenolic aldehyde resin, a polyamide, and a urea formaldehyde resin.

2. A composition capable of forming a baked coating comprising a terpolymer solution formed by copolymerizing in inert solvent 60 parts of styrene, 20 parts of ethylacrylate and 20 parts of glycidyl methacrylate, said terpolymer being admixed with at least 5 parts of an epoxy active agent selected from the group consisting of a dicarboxylic acid having at least six carbon atoms, a phenolic aldehyde resin, a polyamide, and a urea formaldehyde resin.

3. The composition of claim 2 wherein the epoxy active agent is a dicarboxylic acid having at least six carbon atoms.

4. The composition of claim 2 wherein the epoxy active agent is a phenolic aldehyde resin.

5. The composition of claim 2 wherein the epoxy active agent is a polyamide.

6. The composition of claim 2 wherein the epoxy active agent is a cresol-formaldehyde novolak.

7. The composition of claim 2 wherein the epoxy active agent is a urea-formaldehyde resin.

8. The process for producing baked coatings which comprises applying a coating having the composition of claim 2 to a metal substrate and thereafter baking the substrate.

References Cited in the file of this patent

UNITED STATES PATENTS

| 2,787,561 | Sanders | Apr. 2, 1957 |
| 2,897,174 | Chapin et al. | July 28, 1959 |
| 2,918,391 | Hornibrook | Dec. 22, 1959 |